(12) United States Patent
Finkowski et al.

(10) Patent No.: US 7,186,429 B2
(45) Date of Patent: Mar. 6, 2007

(54) FOOD PRODUCT MARKING APPARATUSES AND METHODS

(75) Inventors: James W. Finkowski, Andover, MN (US); Mark E. Arlinghaus, Minneapolis, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 637 days.

(21) Appl. No.: 10/369,205

(22) Filed: Feb. 19, 2003

(65) Prior Publication Data

US 2004/0161516 A1   Aug. 19, 2004

(51) Int. Cl.
*A21C 11/04*   (2006.01)
*A21C 11/12*   (2006.01)
*A21D 6/00*   (2006.01)

(52) U.S. Cl. .................................... 426/383; 426/503
(58) Field of Classification Search ................. 426/87, 426/104, 383, 503, 518
See application file for complete search history.

(56) References Cited

U.S. PATENT DOCUMENTS

| 880,300 | A | | 2/1908 | Hain | |
|---|---|---|---|---|---|
| 1,291,168 | A | | 1/1919 | Ruger | |
| 1,804,296 | A | * | 5/1931 | Winkler | 426/502 |
| 2,246,424 | A | | 6/1941 | Turner | |
| 2,254,759 | A | * | 9/1941 | Stainbrook | 426/27 |
| 2,405,661 | A | * | 8/1946 | Macmanus | 426/499 |
| 2,734,465 | A | * | 2/1956 | Head | 426/502 |
| 3,154,986 | A | * | 11/1964 | Reid | 83/123 |
| 3,230,906 | A | * | 1/1966 | Macmanus | 426/302 |
| 3,427,783 | A | | 2/1969 | Reid | |
| 3,474,742 | A | | 10/1969 | Hedglin | |
| 3,536,014 | A | | 10/1970 | Kuchuris | 107/8 |
| 3,537,406 | A | | 11/1970 | Ort | 107/54 |
| 4,111,624 | A | | 9/1978 | Hanson | 425/135 |
| 4,151,698 | A | | 5/1979 | Müller et al. | 53/131 |
| 4,223,204 | A | | 9/1980 | Benedict | 219/243 |
| 4,229,484 | A | * | 10/1980 | Steels et al. | 426/279 |
| 4,233,799 | A | | 11/1980 | Caille | 53/154 |
| 4,285,978 | A | | 8/1981 | Quinlivan | 426/87 |
| 4,455,320 | A | | 6/1984 | Syrmis | 426/383 |
| 4,535,687 | A | | 8/1985 | Antpöhler | 99/334 |
| 4,578,273 | A | | 3/1986 | Krubert | 426/87 |
| 4,630,426 | A | | 12/1986 | Gentry | 53/428 |
| 4,702,926 | A | | 10/1987 | Fowler | 426/283 |
| 4,843,958 | A | | 7/1989 | Egosi | 101/2 |

(Continued)

*Primary Examiner*—Keith Hendricks
*Assistant Examiner*—Viren Thakur
(74) *Attorney, Agent, or Firm*—Arlene L. Hornilla; Kevin Hubbard

(57) ABSTRACT

A method and apparatus for marking, imprinting or applying a pattern, design or mark to a plurality of individual pieces of food product to be divided from a sheet of food product is described. In one aspect of the invention, a method may include the steps of supplying a sheet of food product, marking the plurality of individual pieces of food product to be divided from the sheet of food product, and dividing, at least partially, the individual pieces of food product from the sheet of food product. In another aspect of the present invention, an apparatus may generally include a support frame, a cutting plate, and a marking head. The cutting plate preferably includes a plurality of cutting openings and an engagement surface capable of supporting and positioning a sheet of food product. The cutting openings preferably correspond to a plurality of individual pieces of food product to be divided from the sheet of food product.

13 Claims, 8 Drawing Sheets

U.S. PATENT DOCUMENTS

| | | | |
|---|---|---|---|
| 4,988,276 A | 1/1991 | Moeller | 425/290 |
| 5,035,907 A * | 7/1991 | Phillips et al. | 426/383 |
| 5,162,119 A | 11/1992 | Pappas et al. | 425/92 |
| 5,247,782 A | 9/1993 | Rejsa | 53/516 |
| 5,284,667 A | 2/1994 | Zimmermann et al. | 426/420 |
| 5,349,759 A | 9/1994 | Anton et al. | 33/524 |
| 5,388,390 A | 2/1995 | Finkowski et al. | 53/516 |
| 5,534,281 A | 7/1996 | Pappas et al. | 426/383 |
| 5,535,575 A * | 7/1996 | Finkowski et al. | 53/516 |
| 5,591,470 A | 1/1997 | Bartley | 426/391 |
| 5,678,394 A | 10/1997 | Finkowski et al. | 53/516 |
| 5,683,734 A | 11/1997 | Israel | 426/496 |
| 5,919,508 A | 7/1999 | Donnelly et al. | 426/420 |
| 6,004,595 A | 12/1999 | Ray et al. | 426/94 |
| 6,230,073 B1 | 5/2001 | Kofman et al. | 700/204 |

* cited by examiner

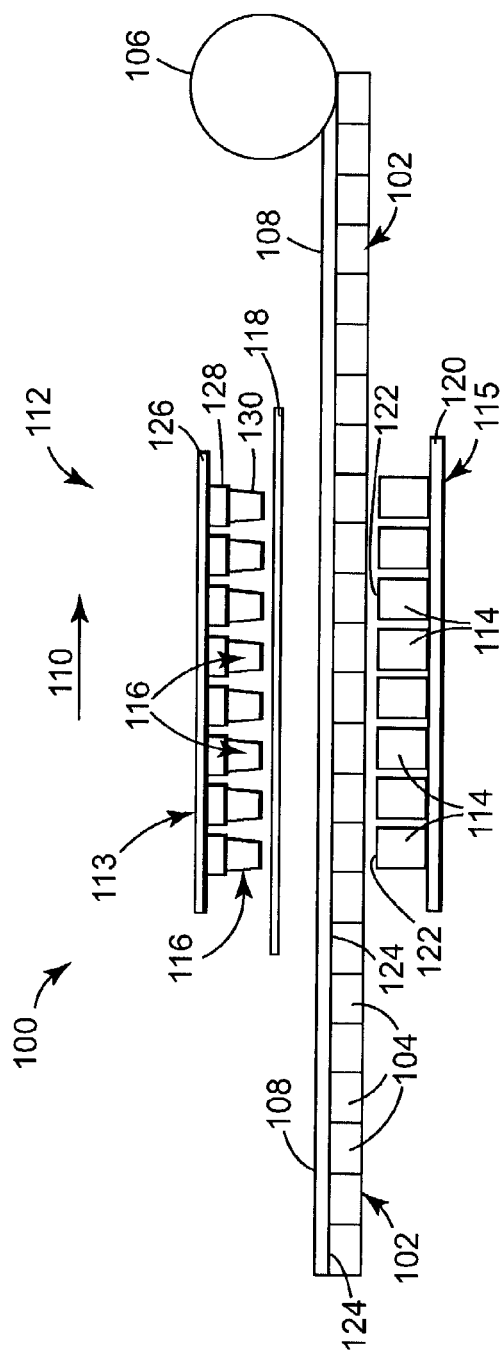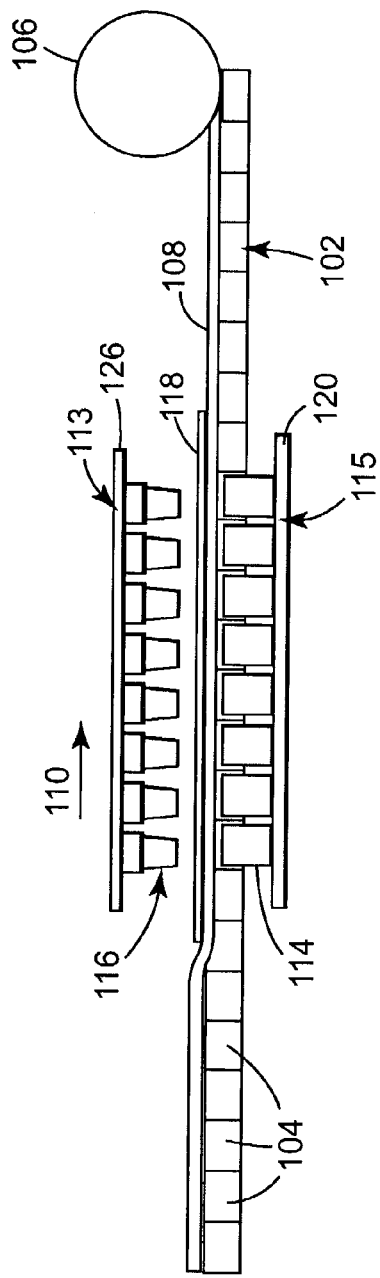

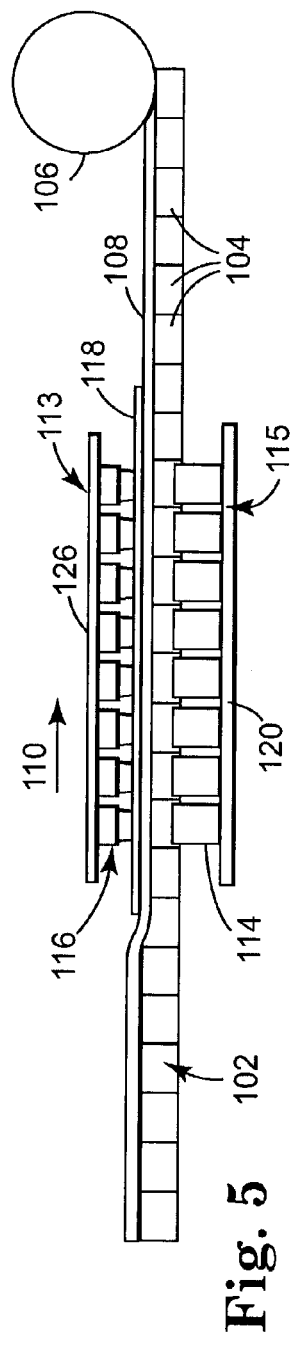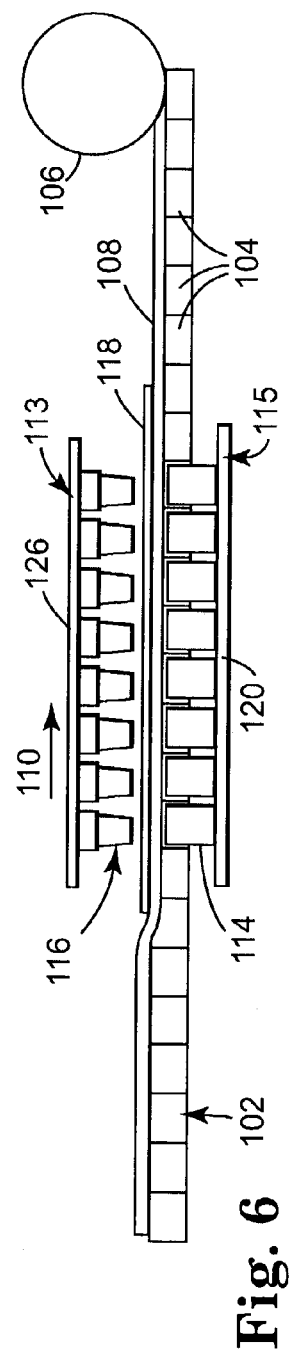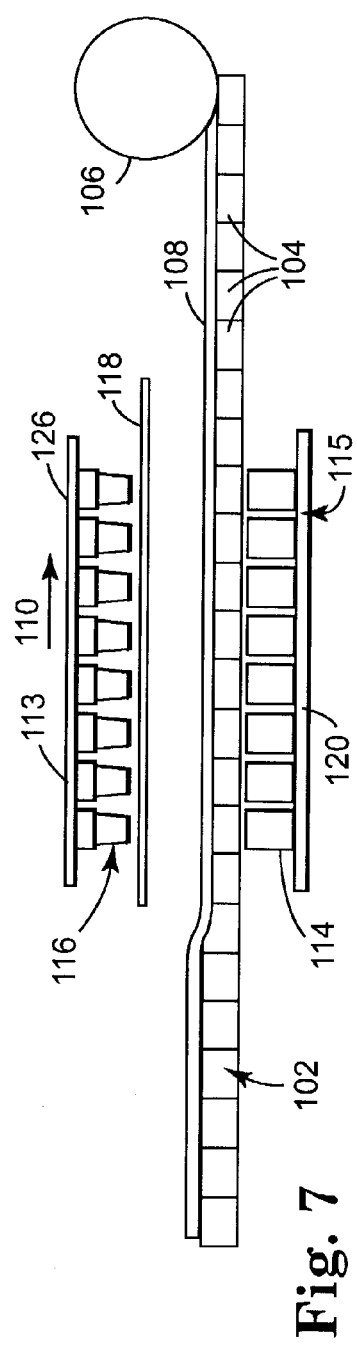

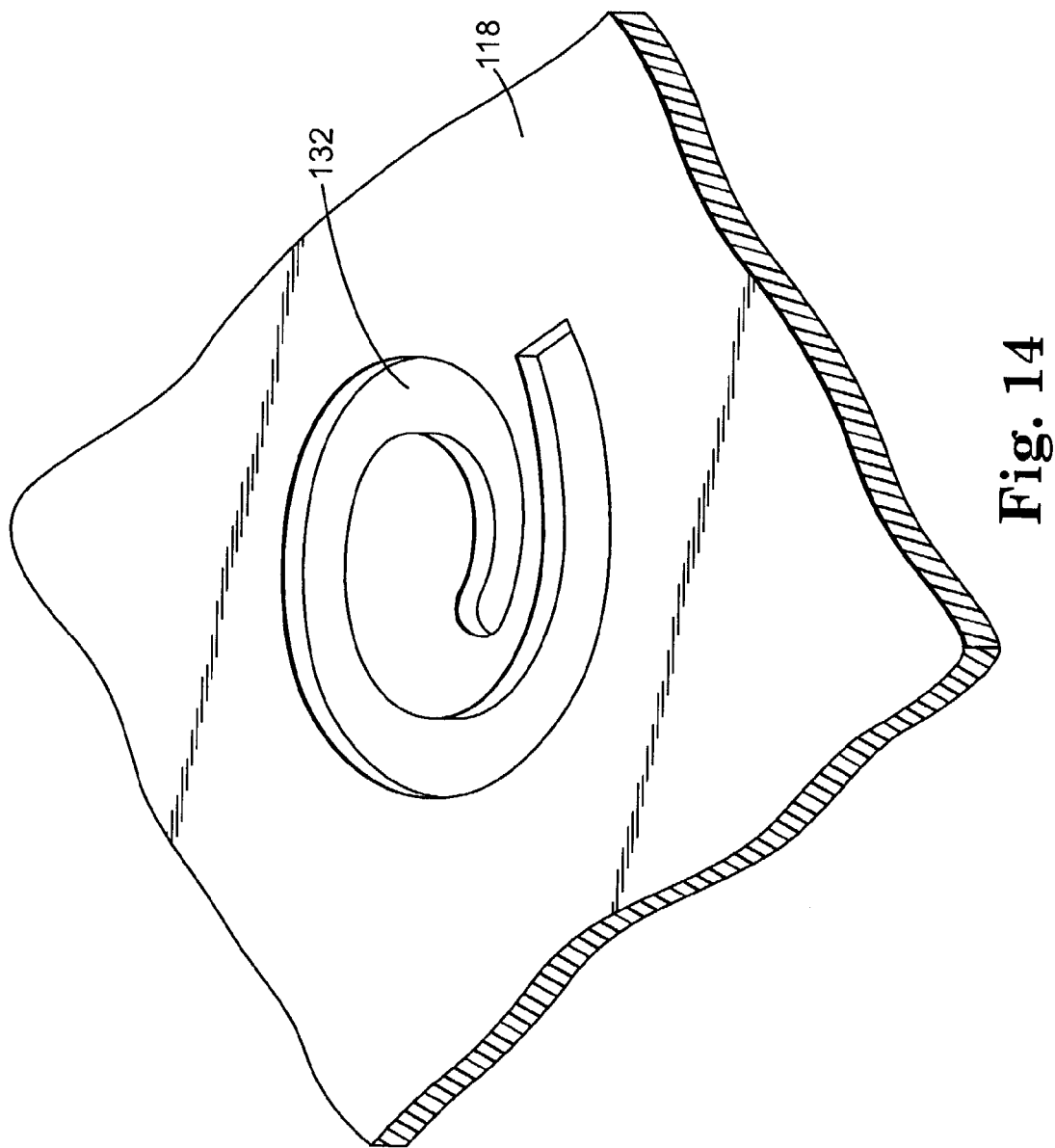

FOOD PRODUCT MARKING APPARATUSES AND METHODS

FIELD OF THE INVENTION

The present invention relates generally to apparatuses and methods for processing food products, such as for marking food products. In particular, the present invention is directed to apparatuses and methods for providing a mark so as to create a pattern, design or label to an individual piece of food product to be divided from a sheet of food product.

BACKGROUND OF THE INVENTION

Consumers commonly enjoy the convenience of packaged food products such as dough products. In particular, raw dough products have gained commercial success as provided in frozen or refrigerated forms to facilitate consumers making home baked dough products. Moreover, such raw dough products are typically packaged to facilitate consumer use, as desired.

Many dough products suitable for packaging as frozen or refrigerated products have been developed. As an example, rolled dough products such as cinnamon rolls as well as non-rolled dough products or slugs such as biscuits and the like are frequently packaged in frozen or refrigerated forms. Rolled dough products are typically made by providing a strip or sheet of dough (with or without a topping) and rolling the strip or sheet as a spiral. In the case of a dough sheet, the roll can be divided transversely into plural dough products. For certain applications, it is desirable that non-rolled dough products have the general appearance of a rolled dough product such as a cinnamon roll product. As such, a dough slug may be scored or marked with a spiral pattern to create a single serving portion that has the general appearance of a rolled dough product. Such marked dough slugs may be more economical to produce than traditionally rolled products thereby reducing the cost to the consumer.

Devices for creating consumer usable packages of raw dough slugs, have been developed that cut a sheet of food product such as dough into individual slugs or pieces and pack the individual dough pieces into containers. For example, U.S. Pat. No. 3,427,783 to Reid, the entire disclosure of which is fully incorporated herein by reference, describes one such dough cutting and packing apparatus. Additional other features and modifications applicable to the Reid apparatus are included in U.S. Pat. No. 5,247,782 to Rejsa, which is also fully incorporated herein by reference.

The cutting and packaging apparatuses of Reid and Rejsa include an endless cutting unit formed by a plurality of intermittently movable, interconnected cutting plates. A sheet of dough, which is usually provided continuously, enters the cutting and packaging apparatus at a first end of the cutting unit. A transversely extending roll (transverse to the direction of travel of the dough sheet) presses the dough sheet against the cutting unit to divide the dough sheet into a plurality of individual dough pieces that are held within hexagonally shaped cutting openings formed in the cutting plates. The apparatus further includes plungers positioned above the cutting unit that can be moved in a reciprocating manner relative to the cutting unit by way of a microprocessor-controlled servodrive as described by Rejsa. During a dwell period of the intermittent motion of the plates, the plungers move downward so they contact the dough pieces held within the hexagonally shaped openings in the cutting plates thereby removing the dough pieces from the cutting unit. Continued downward movement of the plungers causes the individual dough pieces to enter the open ends of containers positioned beneath the cutting unit. The reciprocating movement of the plungers is synchronized with the intermittent movement of the cutting unit so that the cutting unit only moves when the plungers are not extending into or through the openings in the cutting plates.

As mentioned above, for certain products it may be desirable to score or mark a dough slug with a spiral pattern to give it the appearance of a rolled dough product. Such scoring is conventionally done while the dough sheet is positioned on the continuous conveyor that supplies the dough sheet to the cutting and packaging apparatus. A difficulty with such an approach is that it can be difficult to assure proper alignment of such a spiral pattern or scoring on the dough sheet with the cutter that will divide that scored portion from the dough sheet (i.e., so the dough product is properly scored). This is due, in part, to the transition from continuous to intermittent motion that the dough sheet experiences after it is scored and before it is cut. Certain food products provided in sheet form, such as sheets of certain dough based food products, can be dimensionally unstable. Such dimensional instability can be due to internal stresses in a food product itself or may arise from external forces such as from gravity or from certain processing steps. For example, conveyors that are frequently used to handle sheets of dough product may transfer the dough product between multiple offset conveyors. These conveyors can operate at different speeds or may move continuously as well as intermittently or in an indexed manner. A sheet of food product such as a dough product that is transferred between conveyors moving at slightly different speeds or transferred from continuous motion to intermittent motion or from one level to the next may be significantly distorted or shifted as a result of such transfer. As such, a mark formed on a sheet of dough product can become misaligned during such conventional processing, such as a cutting process to divide the sheet of dough product into individual pieces, as a result of such transfer between conveyors.

SUMMARY OF THE INVENTION

The present invention overcomes the disadvantages and shortcomings of the prior art by providing methods and apparatuses for aligning a mark or subsequent deposit of material to an individual piece of food product prior to it being separated or divided from a sheet of food product while at the same time maintaining alignment of the marking with the product shape as it is cut from the sheet of food product.

In one aspect of the present invention, a method of marking a plurality of individual pieces of food product to be divided from a sheet of food product is provided. In general, a method in accordance with the present invention includes the steps of supplying a sheet of food product, marking the plurality of individual pieces of food product to be divided from the sheet of food product, and dividing, at least partially, the individual pieces of food product from the sheet of food product. In the supplying step, the sheet of food product may be supplied to a cutting plate having a plurality of cutting openings. The sheet of food product may be set in position with respect to the cutting openings of the cutting plate so that plural cutting openings correspond to a plurality of individual pieces of food product to be divided from the sheet of food product. The marking step may be performed while the sheet of food product is positioned with respect to the cutting plate so that the marking can be aligned to the plurality of individual pieces of food product to be divided from the sheet of food product. The marking step may further comprise engaging, at least partially, the sheet of food product with the cutting plate so that the individual pieces of food product are at least partially divided from the sheet of food product. Additionally, the individual pieces of food product to be divided from the sheet of food product may be supported, at least partially, while marking the individual pieces of food product to be divided from the sheet of food product by engaging a surface of the individual pieces of food product to be divided from the sheet of food product with a plurality of supporting elements that pass through the cutting openings of the cutting plate.

Additional aspects of the present invention relate to, the marking step which includes but is not limited to stamping, embossing, imprinting or cutting a pattern onto the plurality of individual pieces of food product to be divided from the sheet of food product. The marking step may provide for the depositing of an additional food product or material (such as decorative elements) onto the plurality of individual pieces of food product to be divided from the sheet of food product.

In another aspect of the present invention, an apparatus for marking a plurality of individual pieces of food product to be divided from a sheet of food product is provided. Generally, the apparatus includes a support frame, a cutting plate, and a marking head. The support frame may preferably operatively support the cutting plate. The cutting plate preferably includes a plurality of cutting openings and an engagement surface capable of supporting and positioning a sheet of food product. The cutting openings preferably correspond to a plurality of individual pieces of food product to be divided from the sheet of food product. The marking head may be operatively supported and movable with respect to the engagement surface of the cutting plate and preferably may be capable of marking at least a portion of the surface of the individual pieces of food product that are to be divided from the sheet of food product. The marking head may also comprise a plurality of individual marking devices, which devices correspond with and may be generally aligned with the plurality of cutting openings in the cutting plate.

In another aspect of the present invention the apparatus for marking a plurality of individual pieces of food product to be divided from a sheet of food product may further comprise a stripper plate operatively positioned and movable with respect to the engagement surface of the cutting plate. In an exemplary embodiment, the stripper plate includes a plurality of openings generally aligned with the cutting openings of the cutting plate.

Also, the apparatus may further preferably comprise a support head that may comprise a plurality of supporting elements operatively positioned and movable with respect to the engagement surface of the cutting plate. In this exemplary embodiment, the supporting elements are generally aligned to the cutting openings of the cutting plate for supporting, at least partially, the individual pieces of food product to be divided from the sheet of food product while being marked.

In yet another aspect of the present invention, the apparatus for marking a plurality of individual pieces of food product to be divided from a sheet of food product may further comprise a compression device. In an exemplary embodiment, the compression device may be operatively supported and movable with respect to the engagement surface of the cutting plate for forcing the sheet of food product through the cutting openings of the cutting plate. In one aspect of the present invention, the compression device may include a compression roller operatively positioned with respect to the engagement surface of the cutting plate.

Also, in additional aspects of the present invention, the marking device may include stamping or cutting devices for stamping, applying or cutting a pattern onto the plurality of individual pieces of food product to be divided from the sheet of food product. Also, the marking device may include a food product depositor for depositing an additional food product onto the plurality of individual pieces of food product to be divided from the sheet of food product.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows:

FIG. 3 is a schematic cross-sectional view of an apparatus of the present invention for marking a food product showing in particular a marking head, stripper plate, and support head positioned in a retracted position with respect to a sheet of dough product positioned on a cutting plate before marking the sheet of dough product;

FIG. 4 is a schematic cross-sectional view of the apparatus of FIG. 3 showing in particular the stripper plate and the support head engaged with the sheet of dough product and the marking head moving towards the sheet of dough product;

FIG. 5 is a schematic cross-sectional view of the apparatus of FIG. 4 showing in particular the marking head engaged with the sheet of dough product for marking the sheet of dough product;

FIG. 6 is a schematic cross-sectional view of the apparatus of FIG. 5 showing in particular the marking head moving away from the sheet of dough product after marking the sheet of dough product;

FIG. 7 is a schematic cross-sectional view of the apparatus of FIG. 6 showing in particular the marking head, stripper plate, and support head in a retracted position after marking the sheet of dough product;

FIG. 14 is a perspective view of a portion of a stripper plate of the present invention showing in particular a spiral shaped opening which the marking device of FIG. 13 may pass through.

DETAILED DESCRIPTION

The present invention provides methods and apparatuses for marking a plurality of individual pieces of food product that are to be divided from a sheet of food product such as a sheet of dough product. The present invention may also be used with other food products such as fruit snacks and pasta and masa type products. In particular, the present invention has been developed for the ability to provide a mark that is aligned, in a desired way, to each of a plurality of individual pieces of food product to be divided from a sheet of food product. That is, by the present invention, a mark can be formed in a sheet of food product that is aligned to each of a plurality of individual pieces of food product before the pieces of food product are completely divided from a sheet of food product.

Figure 1:
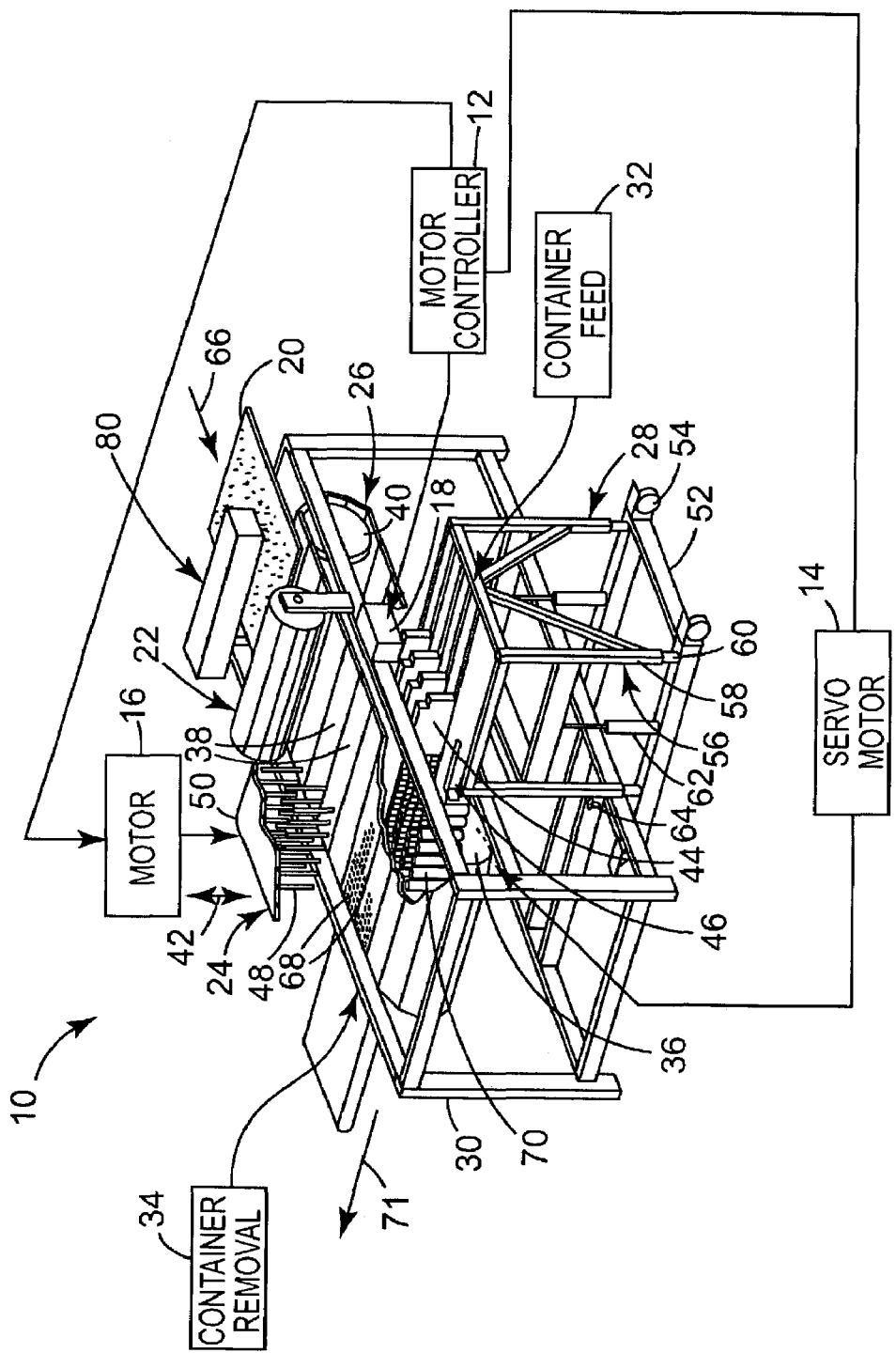
FIG. 1 is an apparatus for marking, cutting, and packaging a food product in accordance with the present invention.

In FIG. 1 a perspective view of an exemplary dough marking, cutting, and packing apparatus 10 according to the present invention, is shown. As mentioned above, devices for cutting a sheet of food product such as a sheet of dough into individual dough slugs, pucks or pieces and packing the individual dough pieces into containers are generally known. For example, U.S. Pat. No. 3,427,783 to Reid, the entire disclosure of which is incorporated herein by reference, describes one such dough cutting and packing apparatus. Other features and modifications applicable to the Reid apparatus are included in U.S. Pat. No. 5,247,782 to Rejsa, which is also fully incorporated herein by reference.

By the illustrated apparatus 10, a sheet of dough product 20 may be continuously fed to an intermittently movable cutter bar assembly 26 of the apparatus 10 in a machine direction 66. The apparatus 10 includes a marking device 80 positioned above the cutter bar assembly 26 for marking the sheet of dough product as described in greater detail below.

Figure 2:
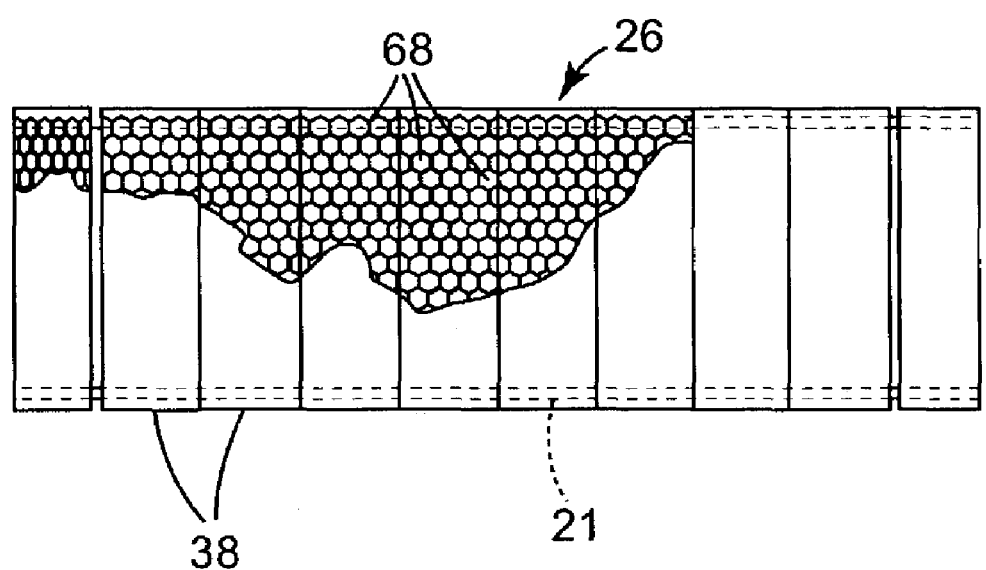
FIG. 2 is a cutter bar assembly of the apparatus of FIG. 1 showing in particular hexagonally shaped cutting openings of cutting plates of the cutter bar assembly.

As an example of an apparatus 10 having cutting and packing features that are usable in accordance with the present invention, the exemplary illustrated apparatus 10 includes drive controller 12, servo drive 14, drive device 16, and servo drive 18, press roller 22, packing head assembly 24, container advancement module 28, container feed mechanism 32 and container removal mechanism 34. Drive controller 12 is preferably a digital computer, a micro controller, or another suitable control element, which is coupled to drives 14, 16 and 18. Servo drive 14 may be coupled, through a drive shaft with a gearbox (not shown), to a drive roller 36 supported for rotation by frame 30. Drive roller 36 and idler roller 40 each have a pair of hubs supporting a pair of sprockets, which mate with a pair of drive chains 21 (see FIG. 2). The drive chains support a plurality of cutting plates 38, which cutting plates 38 preferably include a plurality of cutting openings 68 as can be seen in FIG. 2. The plurality of cutting plates 38 are coupled to one another by the drive chains, which chains are threaded around the hubs of drive roller 36 and idler roller 40 to form an endless belt of cutting plates 38. Preferably drive device 16 is coupled to packing head assembly 24. Drive device 16 drives packing head assembly 24 in a reciprocal motion in the direction indicated by arrow 42. Packing head assembly 24 includes a plurality of packing plungers or tubes 48 which extend out and away from a base plate 50.

As shown, an exemplary container advancement module 28 includes a base 52 supported by wheels 54. Module 28 also includes an upper portion 56 having four hollow members 58 mounted over four pins 60. Pins 60 telescope within hollow members 58. The four hollow members 58 support gear boxes 44 and flighted augers or screws 46. In addition, the entire upper portion 56 of module 28 is supported for vertical movement by actuation of extension cylinders 62 and as guided by the telescoping action of pins 60 within members 58. A pair of locator pins 64 extend downwardly from the upper portion 56 of module 28 and mate with a pair of locator apertures (not shown) on frame 30. The locator pins are preferably cone shaped so as to be self-centering in the apertures. Servo drive 18 is mounted on frame 30 and has a drive shaft releasably coupled to gear boxes 44. Servo drive 18 drives rotation of augers 46 through gear boxes 44. In operation, the dough sheet 20 is advanced in the machine direction indicated by arrow 66. Each of the cutter plates 38 may be formed of a suitable rigid material defining a plurality of shaped openings 68. Preferably, the shaped openings 68 are hexagonally shaped. As dough sheet 20 moves in the machine direction 66, press roller 22 presses the dough into the hexagonal-shaped openings 68 in the cutter plate 38 below press roller 22. This causes the dough to be separated into hexagonally shaped dough pieces. The dough pieces are retained within the openings 68 in cutter plate 38, and the cutter plates 38 are sequentially advanced in the direction indicated by arrow 66 toward packing head assembly 24. During advancement of cutter plate 38, advancement module 28 advances a plurality of containers 70 in a direction indicated by arrow 71 transverse to the direction of movement of dough sheet 20. The containers 70 can be fed to module 28 by container feed mechanism 32 which may comprise any known, commercially available, container feed mechanism, such as an endless conveyor. It is noted that any container advancement technique or method may be used in that the manner by which the container are advanced is not of particular importance to the principles of the present invention. The same is true with respect to the manner by which the packing head assembly 24 is utilized and designed to pack the dough.

When any particular cutter plate 38 is positioned beneath packing head assembly 24, packing head assembly 24 can reciprocate downward and plungers 48 can extend through openings 68 in such cutter plate 38. Thus, plungers 48 press the dough pieces retained in openings 68 down and out the bottom of each successive cutter plate 38. Plungers 48 push the dough pieces into containers 70 which are positioned beneath openings 68, such as by the flighted augers 46 of illustrated module 28. Once the dough pieces are removed from openings 68 in a particular cutter plate 38, the endless cutting unit can be advanced by servo drive 14 so that the next subsequent cutter plate 38 is positioned beneath packing head assembly 24. The containers 70 are then advanced by servo drive 18 in the transverse direction indicated by arrow 71 to be positioned beneath the next subsequent openings 68 in the cutter plate 38. At this point, packing head assembly 24 can again reciprocate downward and pack another dough piece in the containers 70.

Intermittent advancement of the cutter plates 38 and containers 70 is repeated, and dough pieces are placed in containers 70, until containers 70 are full. After that, containers 70 can be removed from dough packing apparatus 10 by a conventional container removal device 34, which may be any suitable, commercially available, container removal device, such as an endless conveyor. Such intermittent or indexed motion of the cutter plates 38 facilitates the reciprocal motion of the plungers 48 for removal of the dough pieces from the openings 68 of the cutter plate 38.

A feeding device such as a conveyor (not shown) preferably feeds dough sheet 20 to apparatus 10 at a constant, continuous velocity. In contrast however, the advancement of cutter plates 38 is only performed intermittently between reciprocal strokes of head assembly 24. In other words, a first cutter plate 38 is advanced to a position under head assembly 24. Then, advancement of the cutter plate 38 stops and head assembly 24 reciprocates to remove dough pieces from the cutter plate under head assembly 24. In order to accommodate the continuous to intermittent motion, an accumulating function is preferably provided between the continuous feeding device and the intermittently moving cutter plates 38 to accumulate the portion of the dough sheet 20 that is fed while the cutter plate 38 is stopped. After the dough pieces are removed, the cutter plates 38 are again indexed until the next subsequent cutter plate 38 is positioned under head assembly 24 at which time reciprocal motion of head assembly 24 removes the retained dough pieces 72 from openings 68 in that next cutter plate 38. As part of each index, new dough is pressed into the upstream cutter plate 38 by press roller 22. The period during which cutter plates 38 are advanced is referred to as an advancement time period and the period during which dough portions are being removed by reciprocation of head assembly 24 is referred to as a dwell time.

The marking device 80 may in an exemplary embodiment be used to mark the dough sheet 20 during the dwell time. As shown in FIG. 1, the marking device 80 is positioned before the press roller 22 along the machine direction 66 and may be driven by any suitable drive device (not shown) such as by using servo motors, line shaft motors, clutch and brake arrangements, or the like. The marking device 80 is driven such that it does not interfere with the cutting plates 38. Also, the marking device 80 is preferably aligned with the cutting openings 68 of the cutting plates 38 so that the marks are made properly on the product. As such, a mark can be aligned to a dough piece in a desired way before it is divided from the dough sheet 20. Such alignment is advantageous in that dough pieces to be divided from the dough sheet 20 are already positioned with respect to cutting openings 68. By aligning the cutting openings 68 to the plungers 48 and the feed device and then aligning the marking device 80 to the openings 68, the dough pieces are properly marked and packed. Moreover, frictional engagement of the dough sheet 20 with the cutting plates 38 desirably helps to prevent misalignment of the marked dough sheet 20 with respect to the cutting openings 68. That is, after the mark is aligned with the dough sheet 20, the dough pieces to be divided from the dough sheet 20 preferably remain aligned with the cutting openings 68, at least in part, by the frictional engagement of the dough sheet 20 with the cutting plates 38.

A mark may be actually formed on a dough piece provided from the sheet of dough product 20 prior to, during or after the dough piece is divided from the sheet of dough product 20. However, the alignment of the marking to the dough piece is ensured prior to any such separation or division. The marking device 80 itself may also partially press the dough sheet 20 into the cutting openings 68 while the marking is performed. Thus, each marked dough piece to be divided from the dough sheet 20 may further be partially engaged with the cutting openings 68 to thereby hold the marked dough pieces in place. Also, the dough sheet 20 may be partially pressed into the cutting openings 68, with an appropriately positioned pressing device or the like, before marking the dough sheet 20 thereby holding the dough pieces to be divided from the dough sheet 20 in a position controllably aligned with the marking device 80 and cutting openings 68.

An exemplary apparatus 100, which is based on the apparatus 10 described above, is shown schematically in cross-section in FIG. 3. As described in detail below, the apparatus 100 may be used to mark one or more dough pieces to be divided from a dough sheet with a mark such as a scroll pattern. Thus, a dough piece can advantageously be given the appearance of a rolled dough product without actually rolling the dough sheet.

As shown, the apparatus 100 includes a series of intermittently movable cutting plates 102 with cutting openings 104 and a compression device such as a press roller 106 operatively positioned to force food product through cutting openings 104. A sheet of food product such as a sheet dough product 108, which can be processed in a machine direction 110, is shown positioned on the movable cutting plates 102. Preferably, the cutting plate 102, cutting openings 104, and press roller 106 are similar to those described above with respect to the apparatus 10. The sheet of dough product 108 may be supplied to the apparatus 100 continuously or intermittently or as discrete sheets of dough product. Additionally, it is contemplated, that the apparatus 100 may be utilized to process any generally sheet-like food product from which plural food products are to be divided and is not limited to dough products. Such additionally exemplary sheeted food products include but are not limited to fruit snacks, pasta and masa sheets and the like In accordance with the present invention, the apparatus 100 preferably includes a marking apparatus 112. A mark may be formed by any process such as by adding to, removing from, or otherwise modifying a food product in some desired way. For example, a pattern or imprint may be formed on a food product such as by stamping, embossing or cutting or the like to provide a mark. Also, food products or portions thereof may be shaped by similar processes, which may also provide a mark in accordance with the present invention. Moreover, certain food products may include deposits formed thereon, which may be food products, decorative items (including confectionary products), either edible or inedible (such as labels), or the like, all of which are contemplated to provide a mark.

Generally, as schematically illustrated, the marking apparatus 112 includes a marking head 113, which in one embodiment includes one or more movable marking devices 116, a support head 115, which in one embodiment includes one or more movable support elements such as support posts 114, and a movable stripper plate 118. The marking head 113, support head 115, and stripper plate 118 are intended to move reciprocally with respect to each other but also may move independently or sequentially. More preferably, the motions of the marking head 113, support head 115, and stripper plate 118 are coordinated with respect to the motion of the cutting plates 102 and can be intermittently actuated accordingly. In particular, the marking head 113, support head 115, and stripper plate 118 preferably are controlled to operate during the dwell periods of the cutting plates 102.

The marking devices 116 may comprise one or more cutting blades, shaping tools, marking tools, or food product depositor devices or any other image or design imparting device. For example, the marking devices 116 may comprise a tool capable of imparting or imprinting a desired shape to a piece of food product to be divided from a sheet of dough product such as a cookie or biscuit or the like or a marking tool such as a marking tool capable forming a desired pattern on a food product.

Further referring to FIG. 3, the support posts 114 are shown attached to a base plate 120. The base plate 120 allows any desired number of support posts 114 to be utilized together, although individual supports posts 114 may be used. The support posts 114 are preferably movable with respect to the cutting plate 102. That is, the support posts 114 are capable of being moved into the cutting openings 104 during a pause in the intermittent motion of the cutting plate 102 so that a surface 122 of a support post 114 can engage with and provide support to a surface 124 of the sheet of dough product 108. Alternatively, other approaches may be used to support or back-up the dough sheet 108. For example, a continuous belt with supports that run with the cutting plates 38 and engage the cutting openings 104 may be used. Such support or back-up may preferably be utilized for marking food products where the marking comprises applying force to the food product, for example. For certain applications, force sufficient to impart a design may be applied by the marking devices 116 to a surface of a dough sheet in order to obtain a desired depth of the mark or to cut through the dough sheet. As such, the support posts 114 can provide support to the dough sheet 108 during the application of such force. It is noted that the reciprocal intermittent motion of the support posts 114 may be obtained by utilizing any mechanical system or device capable of controllably moving the support posts 114 between a retracted position such as is illustrated in FIG. 3 and an engaged position such as is illustrated in FIG. 4 without interference with the cutting plates 38.

Also, the marking devices 116 are preferably attached to a base plate 126. Thus, as with the support posts 114, one or more marking devices 116 may be utilized together to be movable with respect to the cutting plate 102. In the present embodiment, each of the marking devices 116 corresponds with a support post 114 and is supported and maintained in alignment with a cutting opening 104 of the cutting plate 102 in each indexed position of such. Where the marking head 113 and the support head 115 are reciprocally movable, conventional linear slides, guides, or mechanical systems or devices may be used to provide alignment between the marking devices 116 and the support posts 114. Further, any conventional drive system may be used for driving the motion of the marking devices 116 and/or the support posts 114.

Figure 13:
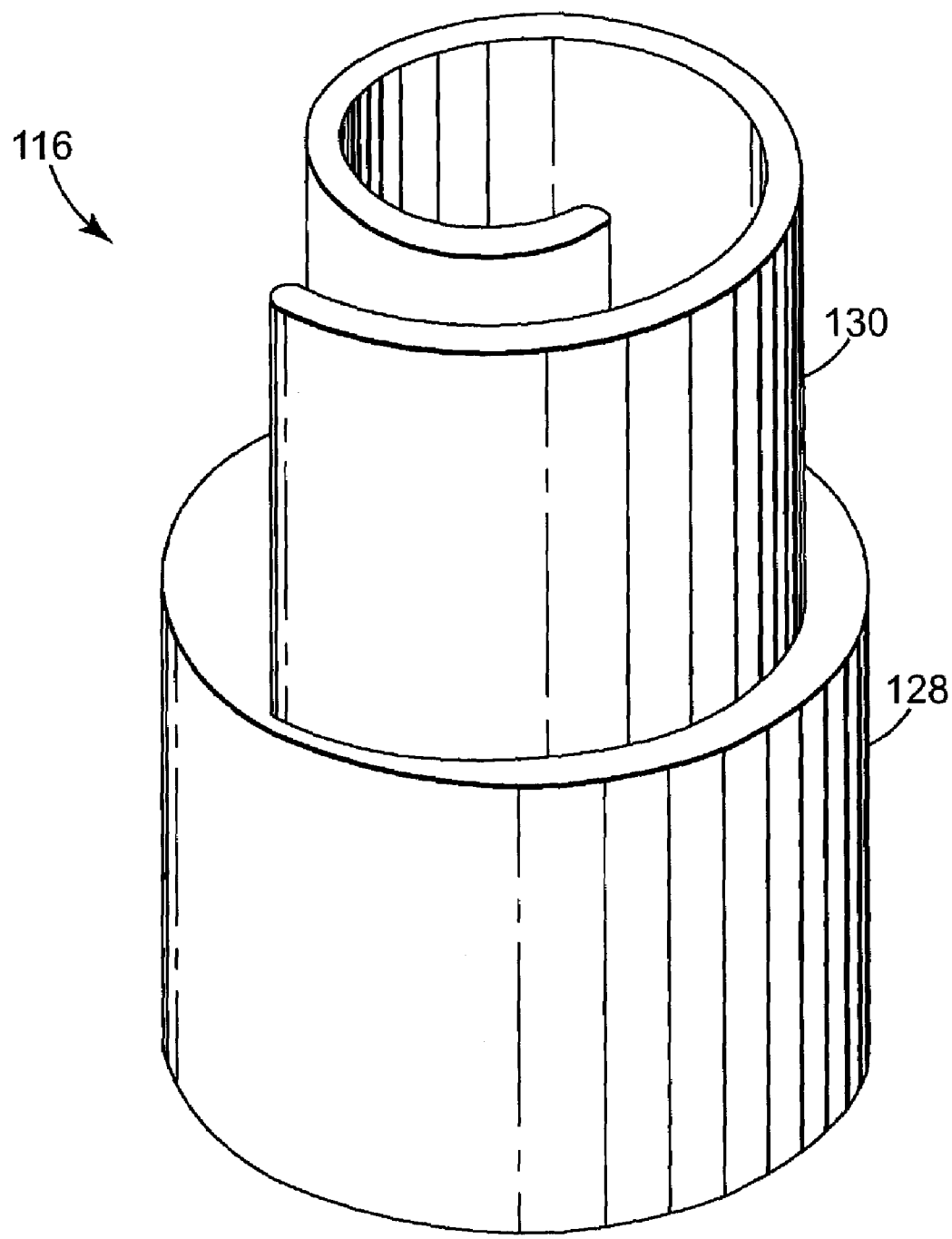
FIG. 13 is a perspective view of a marking device for marking a food product in accordance with the present invention.

Referring to FIG. 13, a perspective view of an exemplary marking device 116 is shown. As illustrated presently, the marking device 116 includes a base 128 for attaching the marking device 116 to the base plate 126. The marking device 116 includes a spiral shaped cutting blade 130 supported by the base plate 126. The cutting blade 130 should be capable of engaging with the sheet of dough product 108 and marking the sheet of dough product 108 such as by applying labels, decorations, marking, cutting and/or displacing dough such as with embossing. The exemplary cutting blade 130, as shown, is capable of forming a spiral shaped mark, and the cutting blade 130 has a depth that ranges up to the thickness of the dough sheet 108. In other words, a mark can be created through the entire thickness of the dough sheet 108 or portions thereof. The mark may have any desired depth, however, depending on the application. It is also contemplated that the cutting blade 130 may be heated, chilled, or coated to provide enhanced marking capabilities. For example, the cutting blade 130 may be coated with "TEFLON®" (polytetrafluoroethylene) non-stick material or other suitable nonstick material in order to prevent dough from sticking to the cutting blade 130 during the marking operation.

Again referring to FIG. 3, the stripper plate 118 in shown positioned above the sheet of dough product 108. Preferably, as can be seen in FIG. 14, the stripper plate 118 includes openings 132 capable of allowing the marking devices 116 to pass through the stripper plate 118. FIG. 14 illustrates a portion of the stripper plate 118 that corresponds to one of the marking devices 116. As shown, the opening 132 is preferably spiral shaped and provides appropriate clearance such that a cutting blade 130 of a marking device 116 can pass through the opening 132. That is, preferably the stripper plate 118 is capable of engaging as much of the dough sheet 108 as possible while also allowing a dough engaging marking device, such as the marking device 116 to pass through. Alternatively, the opening 132 may be generally circular in shape with a diameter allowing clearance for the outside diameter of marking device 116. It is contemplated, that the opening may be slot, rectangularly shaped, or have any other geometric configuration as may be required by the particular application so that one or more marking devices 116 can pass through the stripper plate 118.

For certain applications, the stripper plate 118 may be utilized to hold the sheet of dough product 108 after the marking devices 116 have engaged the sheet of dough product 108 so that the marking devices 116 may be disengaged from the sheet of dough product 108 without pulling the sheet of dough product 108 away from the cutting plate 102. Accordingly, accurate alignment can advantageously be obtained between the marked dough product and the cutting plate 102 by holding the dough sheet 108 against the cutting plate 102 while retracting the marking devices 116. Also, for certain applications, the stripper plate 118 may be used to at least partially press the sheet of dough product 108 into the cutting openings 104 of the cutting plate 102. Several alternative capabilities of the stripper plate 118 are described in greater detail below. For certain applications, the stripper plate 118 may not be needed and may be omitted.

In one aspect of the present invention, the marking devices 116 and stripper plate 118 may be independently movable and drivable with respect to each other such as by comprising independent drive devices. In another aspect of the present invention the marking devices 116 and stripper plate 118 may be part of a common mechanical system and may be moved together. For example, the stripper plate 118 may be attached to the marking devices 116 in a way to permit limited relative movement but with a resistance providing device between them, which may comprise springs or air cylinders or the like. In such an arrangement, the marking devices 116 may be driven by a drive device thereby moving both the stripper plate 118 and the marking devices 116 together. That is, the stripper plate 118 need not be independently driven. When the stripper plate 118 encounters resistance, such as by contacting the sheet of dough product 108 or a hard stop positioned outside or the dough sheet, the marking devices 116 may continue moving into the sheet while relative movement of the marking heads 116 with respect to the stripper plate 118 occurs. The stripper plate 118 can thus provide a predetermined force against the sheet of dough product 108. For certain applications, however, the stripper plate 118 may reach a position where it moves together with the marking devices 116, such as by encountering a hard stop or the like arranged between them.

In FIGS. 3–7, various steps of a method of marking a sheet of food product such as a dough product with the apparatus 100 are shown. In FIG. 3, the support posts 114, marking devices 116, and stripper plate 118 are illustrated in a retracted position. In such a position the cutting plate 102 can intermittently advance in the machine direction 110 without interference from support posts 114, marking devices 116, or stripper plate 118. As described above, the cutting plate 102 moves intermittently thereby having an advancement period and a dwell period. Accordingly, the movements of the support ports 114, marking devices 116, and stripper plate 118 are preferably timed with respect to the advancement period and dwell period.

In FIG. 4, the support posts 114 are shown in an engaged position, which occurs during the dwell period of the cutting plate 102. That is, the support posts 114 are positioned within the cutting openings 104 such that the surfaces 122 of the support posts 114 can engage with and provide support to portions of the surface 124 of the sheet of dough product 108. Also, the stripper plate 118 is shown contacting the dough product 108. As such, the stripper plate 118, if used, may apply a force to partially or completely press the sheet of dough product 108 into the cutting openings 104 of the cutting plate 102 before marking the dough sheet 108 so as to ensure alignment thereof to the dough piece to be formed. Further, the marking heads 116 are shown in a position that is closer to the sheet of dough product than the fully retracted position shown in FIG. 3. In other words, the marking heads 116 are moving downward.

In FIG. 5, the marking devices 116 are shown in an engaged position with the sheet of dough product 108. Again, this occurs during the dwell period. The stripper plate 118 is shown engaged with the cutting plate 102 (although it may still be anywhere above it) and the marking devices 116 are marking each of the individual pieces of dough product that correspond with each of the cutting openings 104. As shown, the support posts 114 are also engaged with the dough surface 124 thereby providing support to the sheet of dough product 108 while the marking devices 116 are engaging the sheet of dough product 108 from above. At this point, the marking devices 116 are fully advanced to a predetermined position depending on the marking depth desired. It is noted that the support posts 114 may not be required for certain applications such as where a more rigid food product is being marked or where a topping, additional food product, or the like is being deposited to a sheet of food product.

In FIG. 6, the marking head 113 is shown partially retracted after the marking devices 116 have moved back through the stripper plate 118 and after the marking devices 116 have marked the sheet of dough product 108. As described above, the stripper plate 118, when needed, is preferably used to prevent the sheet of dough product 108 from being pulled away from the cutting plate 102 while the marking devices 116 are being retracted thereby maintaining the desired alignment between the dough and cutters.

In FIG. 7, the support posts 114, marking devices 116, and stripper plate 118 are each shown in a retracted position after the sheet of dough product 108 has been marked. As such, the cutting plate 102 may now be indexed forward thereby moving an unmarked portion of the sheet of dough product 108 into an aligned position with respect to the marking device 112. As the marked sheet of dough product 108 is being moved in the machine direction 110, the press roller 106 may be used based upon any specific application to completely press the marked sheet of dough product into the cutting openings 104 of the cutting plate 102.

Figure 8:
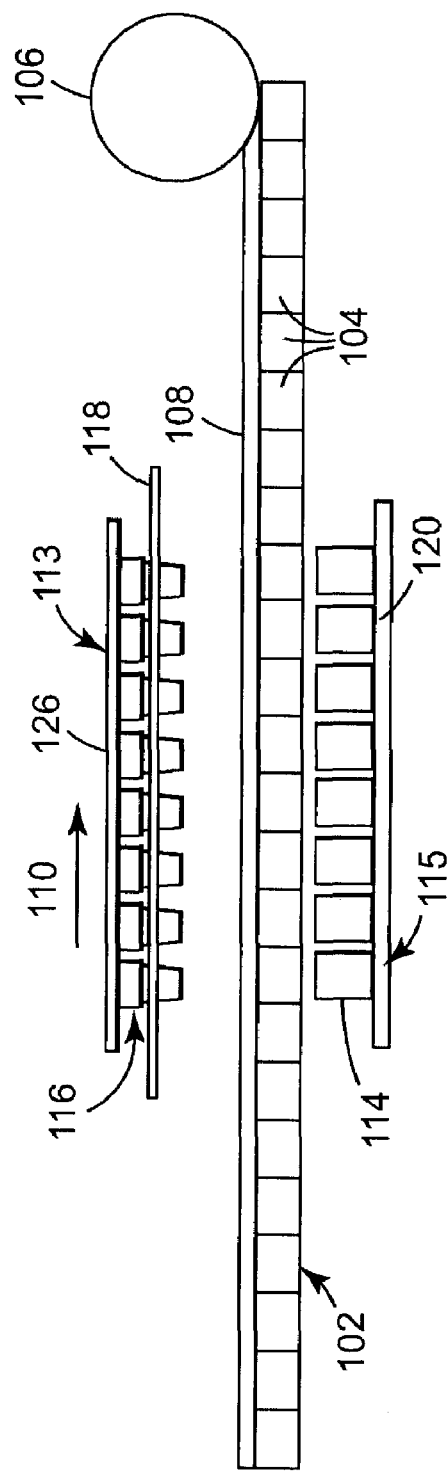
FIG. 8 is a schematic cross-sectional view of another apparatus of the present invention for marking a food product showing in particular a marking head having marking devices positioned partly through openings of a stripper plate, and a support head positioned in a retracted position with respect to a sheet of dough product positioned on a cutting plate before marking the sheet of dough product.

In FIGS. 8–12, various steps of an alternative method of marking a sheet of food product such as a dough product with the apparatus 100 are shown. In FIG. 8, the support posts 114, marking devices 116, and stripper plate 118 are shown in retracted positions. In particular, the marking devices 116 are shown in a position wherein the marking devices 116 are positioned at least partially through the openings of the stripper plate 118.

Figure 9:
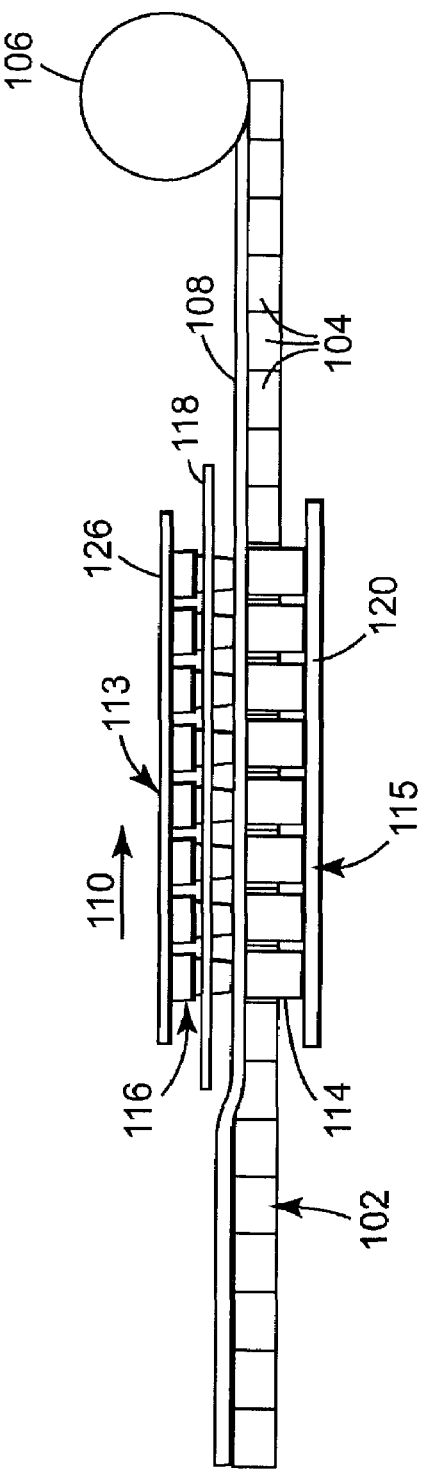
FIG. 9 is a schematic cross-sectional view of the apparatus of FIG. 8 showing in particular the support head in an engaged position and the marking head engaged with the sheet of dough product for marking the sheet of dough product.
Figure 10:
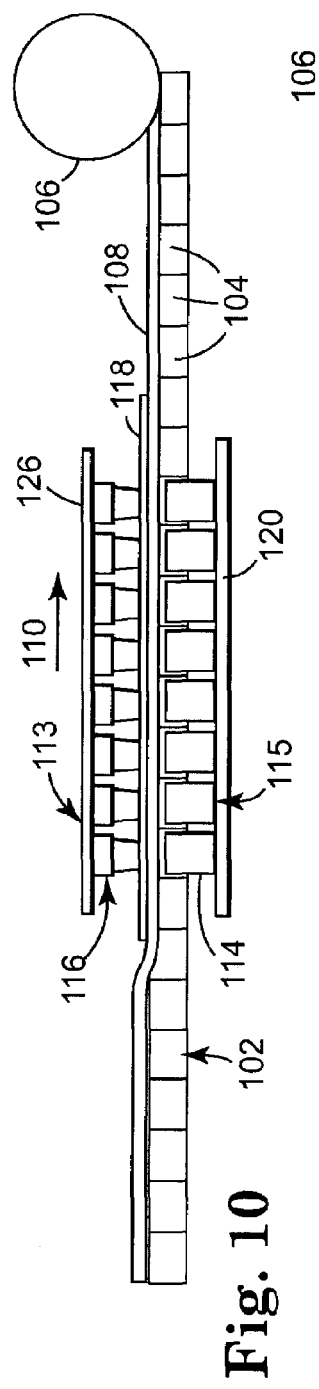
FIG. 10 is a schematic cross-sectional view of the apparatus of FIG. 9 showing in particular the stripper plate engaged with the sheet of dough product.
Figure 11:
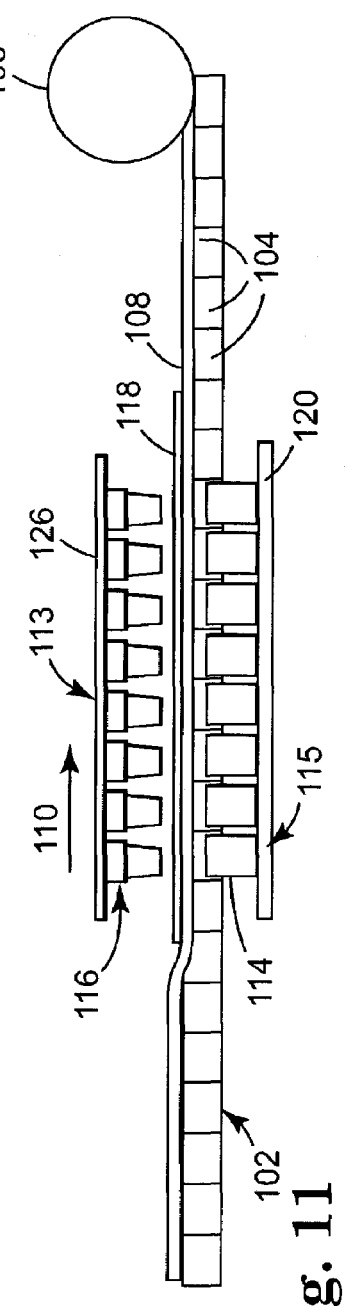
FIG. 11 is a schematic cross-sectional view of the apparatus of FIG. 10 showing in particular the marking head moving away from the sheet of dough product after marking the sheet of dough product and while the stripper plate is engaged.

In FIG. 9, the marking devices 116 are shown engaging with the sheet of dough product 108 before the stripper plate 118 contacts the sheet of dough product 108. In FIG. 10, the marking devices 116 are shown fully extended within the sheet of dough product 108 (depending on the desired depth of the mark) and the stripper plate 118 is shown engaged with the sheet of dough product 108. As such, the stripper plate 118 does not contact the sheet of dough product 108 until after the marking devices 116 have at least partially engaged with the sheet of dough product 108. For such motion, the stripper plate 118 and marking devices may be independently moved with respect to each other. As shown in FIG. 11, the stripper plate 118 preferably remains in a position where it can prevent the sheet of dough product 108 from being lifted away from the cutting plate 102 as the marking devices 116 are being retracted.

Figure 12:
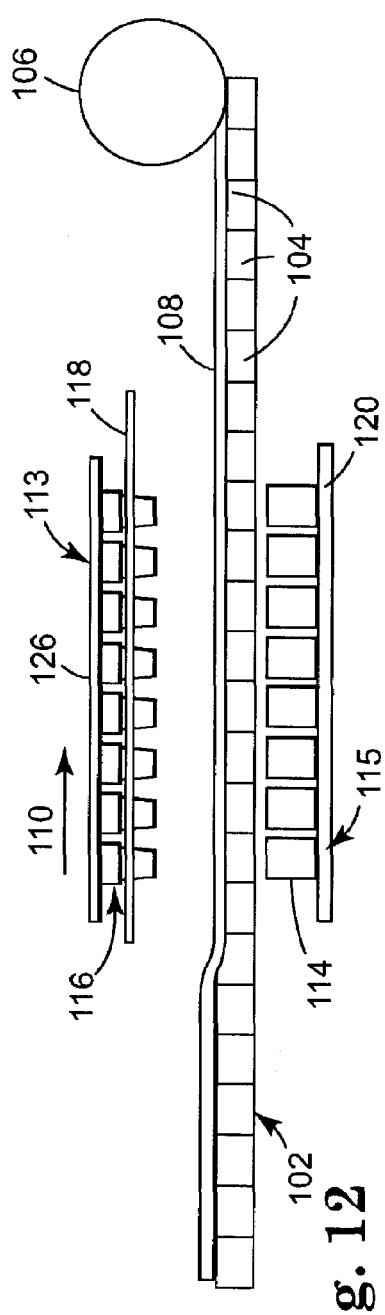
FIG. 12 is a schematic cross-sectional view of the apparatus of FIG. 11 showing in particular the marking head, stripper plate, and support head in a retracted position after marking the sheet of dough product.

In FIG. 12, the support posts 114, marking devices 116, and stripper plate 118 are each shown in a retracted position after the sheet of dough product 108 has been marked. As such, the cutting plate 102 may now be indexed forward thereby moving an unmarked portion of the sheet of dough product 108 into an aligned position with respect to the marking device 112. As the marked sheet of dough product 108 is being moved in the machine direction 110 the press roller 106 may be used for certain applications to completely press the marked sheet of dough product into the cutting openings 104 of the cutting plate 102.

Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A method of marking a plurality of individual pieces of food product to be divided from a sheet of food product, the method comprising the steps of:

supplying a sheet of food product to a cutting plate having a plurality of cutting openings and positioning the sheet of food product with respect to the plurality of cutting openings so that the plurality of cutting openings correspond to a plurality of individual pieces of food product to be divided from the sheet of food product;

marking the plurality of individual pieces of food product to be divided from the sheet of food product while the individual pieces of food product to be divided from the sheet of food product are positioned with respect to the cutting plate so that the marking is aligned to the plurality of individual pieces of food product to be divided from the sheet of food product and the plurality of cutting openings;

moving a plurality of supporting elements into the plurality of cutting openings of the cutting plate to support the plurality of individual pieces of food product to be divided from the sheet of food product while marking the plurality of individual pieces of food product to be divided from the sheet of food product; and dividing, at least partially, the individual pieces of food product from the sheet of food product.

2. The method of claim 1, wherein the step of supplying a sheet of food product comprises continuously supplying the sheet of food product.

3. The method of claim 1, wherein the step of supplying a sheet of food product comprises intermittently supplying the sheet of food product.

4. The method of claim 1, wherein the marking step comprises applying a pattern onto the plurality of individual pieces of food product to be divided from the sheet of food product.

5. The method of claim 4, wherein the pattern is applied by cutting, stamping, embossing, or labeling.

6. The method of claim 1, wherein the marking step comprises depositing an additional food element onto the plurality of individual pieces of food product to be divided from the sheet of food product.

7. The method of claim 6, wherein the additional element is a decoration, label or food product.

8. The method of claim 1, wherein the marking step comprises marking the plurality of individual pieces of food product to be divided from the sheet of food product with a spiral mark capable of forming an individual piece of food product that has the general appearance of a rolled food product.

9. The method of claim 1, wherein the marking step further comprises at least partially engaging the sheet of food product with the cutting plate so that the individual pieces of food product to be divided from the sheet of food product are at least partially divided from the sheet of food product.

10. The method of claim 1, wherein the food product is dough.

11. The method of claim 1, wherein the food product is a fruit snack.

12. The method of claim 1, wherein the food product is a pasta or masa product.

13. A method of marking a plurality of individual pieces of food product divided from a sheet of food product, the method comprising the steps of:

supplying a sheet of food product to a cutting plate having a plurality of cutting openings and positioning the sheet of food product with respect to the plurality of cutting openings so that the plurality of cutting openings correspond to a plurality of individual pieces of food product to be divided from the sheet of food product;

dividing individual pieces of food product from the sheet of food product so that the individual pieces of food product are positioned in the plurality of cutting openings of the cutting plate;

moving a plurality of supporting elements into the plurality of cutting openings of the cutting plate to support the plurality of individual pieces of food product positioned in the plurality of cutting openings of the cutting plate; and marking the plurality of individual pieces of food product positioned in the plurality of cutting openings of the cutting plate while supporting the plurality of individual pieces of food product.

* * * * *